(12) United States Patent
Liang et al.

(10) Patent No.: US 11,936,259 B2
(45) Date of Patent: Mar. 19, 2024

(54) FOOD PROCESSOR AND ELECTRIC MOTOR FOR FOOD PROCESSOR

(71) Applicant: GUANGDONG MIDEA CONSUMER ELECTRIC MANUFACTURING CO., LTD., Foshan (CN)

(72) Inventors: Xiantang Liang, Foshan (CN); Liancheng Chen, Foshan (CN); Congshan Pang, Foshan (CN); Zhifeng Wang, Foshan (CN); Lei Xiao, Foshan (CN); Zhenfeng Yang, Foshan (CN)

(73) Assignee: GUANGDONG MIDEA CONSUMER ELECTRIC MANUFACTURING CO., LTD., Foshan (CN)

( * ) Notice: Subject to any disclaimer, the term of this patent is extended or adjusted under 35 U.S.C. 154(b) by 891 days.

(21) Appl. No.: 16/968,876

(22) PCT Filed: Aug. 3, 2018

(86) PCT No.: PCT/CN2018/098625
§ 371 (c)(1),
(2) Date: Aug. 11, 2020

(87) PCT Pub. No.: WO2019/169828
PCT Pub. Date: Sep. 12, 2019

(65) Prior Publication Data
US 2021/0013785 A1 Jan. 14, 2021

(30) Foreign Application Priority Data

Mar. 7, 2018 (CN) .......................... 201810187834.6
Mar. 7, 2018 (CN) .......................... 201810187842.0
(Continued)

(51) Int. Cl.
*H02K 1/27* (2022.01)
*A23N 1/02* (2006.01)
(Continued)

(52) U.S. Cl.
CPC ............... *H02K 29/03* (2013.01); *A23N 1/02* (2013.01); *A47J 43/046* (2013.01); *A47J 43/085* (2013.01);
(Continued)

(58) Field of Classification Search
CPC .... H02K 1/27; H02K 1/14; H02K 1/146; H02K 1/185; H02K 1/276; H02K 21/16;
(Continued)

(56) References Cited

U.S. PATENT DOCUMENTS 6,008,559 A * 12/1999 Asano ................... H02K 1/276
310/216.073
8,405,269 B2 * 3/2013 Spaggiari ............... H02K 29/03
310/156.53
(Continued)

FOREIGN PATENT DOCUMENTS

CN 101379674 A 3/2009
CN 203352305 U 12/2013
(Continued)

OTHER PUBLICATIONS

International Search Report of PCT/CN2018/098625.
(Continued)

*Primary Examiner* — Thomas Truong

(57) ABSTRACT

A food processor and an electric motor for a food processor. The electric motor includes: a stator core having a ring-shaped stator yoke and a plurality of stator teeth provided at an inner peripheral face of the stator yoke, two adjacent stator teeth defining a stator slot there between, the plurality of the stator teeth defining a stator hole coaxial with the stator yoke, and an outer contour of a radial section of the stator yoke being substantially circular and having a maximum radial dimension D; and a rotor core rotatably provided in the stator hole and coaxial with the stator hole, the rotor
(Continued)

core having a maximum radial dimension d, in which $0.4 \leq d/D \leq 0.55$.

19 Claims, 4 Drawing Sheets

(30) Foreign Application Priority Data

Mar. 7, 2018 (CN) .......................... 201820315628.4
Mar. 7, 2018 (CN) .......................... 201820316060.8

(51) Int. Cl.
*A47J 43/00* (2006.01)
*A47J 43/046* (2006.01)
*A47J 43/08* (2006.01)
*H02K 1/14* (2006.01)
*H02K 1/276* (2022.01)
*H02K 11/30* (2016.01)
*H02K 21/16* (2006.01)
*H02K 29/03* (2006.01)

(52) U.S. Cl.
CPC ............. *H02K 1/146* (2013.01); *H02K 1/276* (2013.01); *H02K 11/30* (2016.01); *H02K 21/16* (2013.01); *H02K 2211/03* (2013.01); *H02K 2213/03* (2013.01)

(58) Field of Classification Search
CPC .... H02K 2213/03; H02K 29/03; H02K 11/30; H02K 2211/03; A23N 1/02; A47J 43/046; A47J 43/085; A47J 43/0716; A47J 19/00; A47J 43/08
See application file for complete search history.

(56) References Cited

U.S. PATENT DOCUMENTS

| 10,498,206 | B2 * | 12/2019 | Tanimoto | ............... H02K 29/00 |
| 10,587,163 | B2 * | 3/2020 | Crosby | ................. H02K 7/145 |
| 2003/0048024 | A1 | 3/2003 | Chu | |
| 2006/0131976 | A1 | 6/2006 | Kikuchi et al. | |
| 2009/0115279 | A1 | 5/2009 | Spaggiari | |
| 2013/0192477 | A1 | 8/2013 | Hoare et al. | |

FOREIGN PATENT DOCUMENTS

| CN | 204928523 U | 12/2015 |
| CN | 106026465 A | 10/2016 |
| CN | 205753804 U | 11/2016 |
| CN | 206302221 U | 7/2017 |
| CN | 206333820 U | 7/2017 |
| CN | 107528400 A | 12/2017 |
| CN | 206992884 U | 2/2018 |
| CN | 207939273 U | 10/2018 |
| CN | 207939278 U | 10/2018 |
| EP | 2083503 A2 | 7/2009 |
| JP | 2007050011 A | 3/2007 |
| JP | 2008005580 A | 1/2008 |
| JP | 2008545364 A | 12/2008 |
| JP | 2013135730 A | 7/2013 |
| WO | 2007088919 A1 | 8/2007 |
| WO | 2017163523 A1 | 9/2017 |
| WO | 2018020631 A1 | 2/2018 |

OTHER PUBLICATIONS

OA for EP application 18908712.5.
Brushless Permanent Magnet Motor Design.
Second OA for CN application 201810187842.0.
OA for JP application 2020-540417.

* cited by examiner

FOOD PROCESSOR AND ELECTRIC MOTOR FOR FOOD PROCESSOR

CROSS-REFERENCES TO RELATED APPLICATIONS

This application is a national phase of International Application No. PCT/CN2018/098625, filed on Aug. 3, 2018, which claims priority to Chinese Patent Applications Ser. No. 201820316060. 8, No. 201810187842. 0, No. 201820315628.4 and No. 201810187834. 6 filed in the Chinese Patent Office on Mar. 7, 2018, the entireties of which are herein incorporated by reference.

FIELD

The present invention relates to the field of food processor technologies, and more particularly to a food processor and an electric motor for a food processor.

BACKGROUND

In a related art, an electric motor has a poor high-speed performance and is easy to generate vibration.

SUMMARY

The present application is based on the inventor's discovery and knowledge of the following facts and problems.

In the related art, a ratio of a rotor diameter to a stator diameter of an electric motor is not constant, usually between 0.60 and 0.75. Within this range, although it may output a large torque, the electric motor has a poor high-speed performance and an increased cogging torque, and is prone to generate vibration and relatively large noises. An energy efficiency of the electric motor will be reduced if the above-mentioned problem is solved by adding a flux weakening effect in an algorithm of a drive and control circuit.

The present invention seeks to solve at least one of the problems existing in the related art to at least some extent. To this end, the present invention proposes an electric motor for a food processor, for solving the problems of the electric motor of a small output force at a low speed and vibration noises at a high speed effectively.

The present invention further proposes a food processor having the above-mentioned electric motor.

An electric motor for a food processor according to an embodiment of the present invention includes a stator core including a ring-shaped stator yoke and a plurality of stator teeth provided at an inner peripheral face of the stator yoke, two adjacent stator teeth defining a stator slot there between, the plurality of the stator teeth defining a stator hole coaxial with the stator yoke, and an outer contour of a radial section of the stator yoke being substantially circular and having a maximum radial dimension D; a rotor core rotatably provided in the stator hole and coaxial with the stator hole, the rotor core having a maximum radial dimension d, in which $0.4 \leq d/D \leq 0.55$.

The electric motor according to the embodiment of the present invention solves the problems of the electric motor of a small output force at a low speed and vibration noises at a high speed effectively, and improves an efficiency and a safety performance of the electric motor.

In addition, the electric motor according to the above-mentioned embodiment of the present invention may also have the following additional technical features.

In the electric motor according to the embodiment of the present invention, D and d further satisfy: $0.5 \leq d/D \leq 0.55$.

According to some embodiments of the present invention, the rotor core is provided therein with a plurality of magnet slots spaced apart in a circumferential direction of the rotor core and configured to insert permanent magnets, two ends of the magnet slot extend to two axial ends of the rotor core respectively, and at least one end of each of the magnet slots in the circumferential direction of the rotor core is provided with a positioning groove configured to position the permanent magnet.

Further, a straight-line distance between two ends of each of the magnet slots in the circumferential direction of the rotor core is b, and a maximum radial distance between a center of the rotor core and an outer peripheral face of the rotor core is R, in which $b:R=0.95-1.0$.

Further, a minimum distance between the magnet slot and the outer peripheral face of the rotor core is a1, and a minimum distance between the positioning groove and the outer peripheral face of the rotor core is a2, in which $\min(a1, a2)=0.8$ mm-1.8 mm.

According to some embodiments of the present invention, the magnet slot is an elongated arc-shaped slot or a linear slot, and a bisector of the magnet slot in a length direction passes through a center of the rotor core.

In some embodiments of the present invention, the stator core further includes: a plurality of positioning protrusions spaced apart in a circumferential direction of the rotor yoke and provided at the outer peripheral face of the stator yoke, and each of the positioning protrusions extending in a radial direction of the stator yoke.

According to some embodiments of the present invention, the rotor core has an outer periphery provided with a plurality of pole teeth distributed in a circumferential direction of the rotor core and protruding outwards, and two adjacent pole teeth define a tooth slot there between.

Further, a normal tooth profile of the pole tooth is formed into an arc shape, and a radius of a circle with a center of the rotor core as a center and tangent to a tooth crest of the pole tooth is R, and a radius of a circle tangent to a bottom of the tooth slot and with the center of the rotor core as a center is r, in which $r:R=0.96-0.98$.

In some embodiments of the present invention, a width of the stator yoke is W and is equal everywhere, each of the stator teeth includes a stator tooth body connected to the stator yoke and a stator tooth shoe provided at an inner end of the stator tooth body, and a width of each of the stator tooth bodies is V, in which $W:V=0.6-0.7$.

Further, W and V further satisfy: $W:V=0.64-0.66$.

According to some embodiments of the present invention, the width of each of the stator tooth bodies is equal everywhere.

Further, the stator yoke is a circular ring having both a circular inner contour and a circular outer contour.

In some embodiments of the present invention, in the circumferential direction of the stator yoke, two ends of the stator tooth shoe extend beyond the stator tooth body respectively, and adjacent ends of two adjacent stator tooth shoes are spaced apart or connected.

According to some embodiments of the present invention, the electric motor is a brushless direct-current electric motor with a power P of 500 W-2000 W.

According to some embodiments of the present invention, the electric motor is a variable frequency brushless electric motor.

A food processor according to an embodiment of the present invention includes a processing container defining a food accommodating cavity configured to contain food; an electric motor according to an embodiment of the present invention; and a food processing member configured to process food, extending into the food accommodating cavity, and configured to rotate relative to the processing container under driving of the electric motor.

Further, the food processor further includes: a base. The processing container is configured as a cup assembly detachably provided at the base, the electric motor is mounted at the base, the food processing member is configured as a knife assembly connected with the cup assembly, and when the cup assembly is provided at the base, the electric motor is in transmission connection with the knife assembly to drive the knife assembly to rotate relative to the cup assembly.

The food processor according to a further embodiment of the present invention further includes: an electric control system having an electric control board mounted at the base and electrically connected with the electric motor to control the electric motor to work; a display assembly configured to display an operating state of the food processor, mounted at the base and electrically connected to the electric control system.

In one embodiment, the food processor is configured as a blender, a high speed blender, a slow juicer, a juice extractor, or a soymilk maker.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above-mentioned and/or additional aspects and advantages of the present invention will become apparent and more readily appreciated from the following descriptions made with reference to the drawings, in which.

Figure 1:
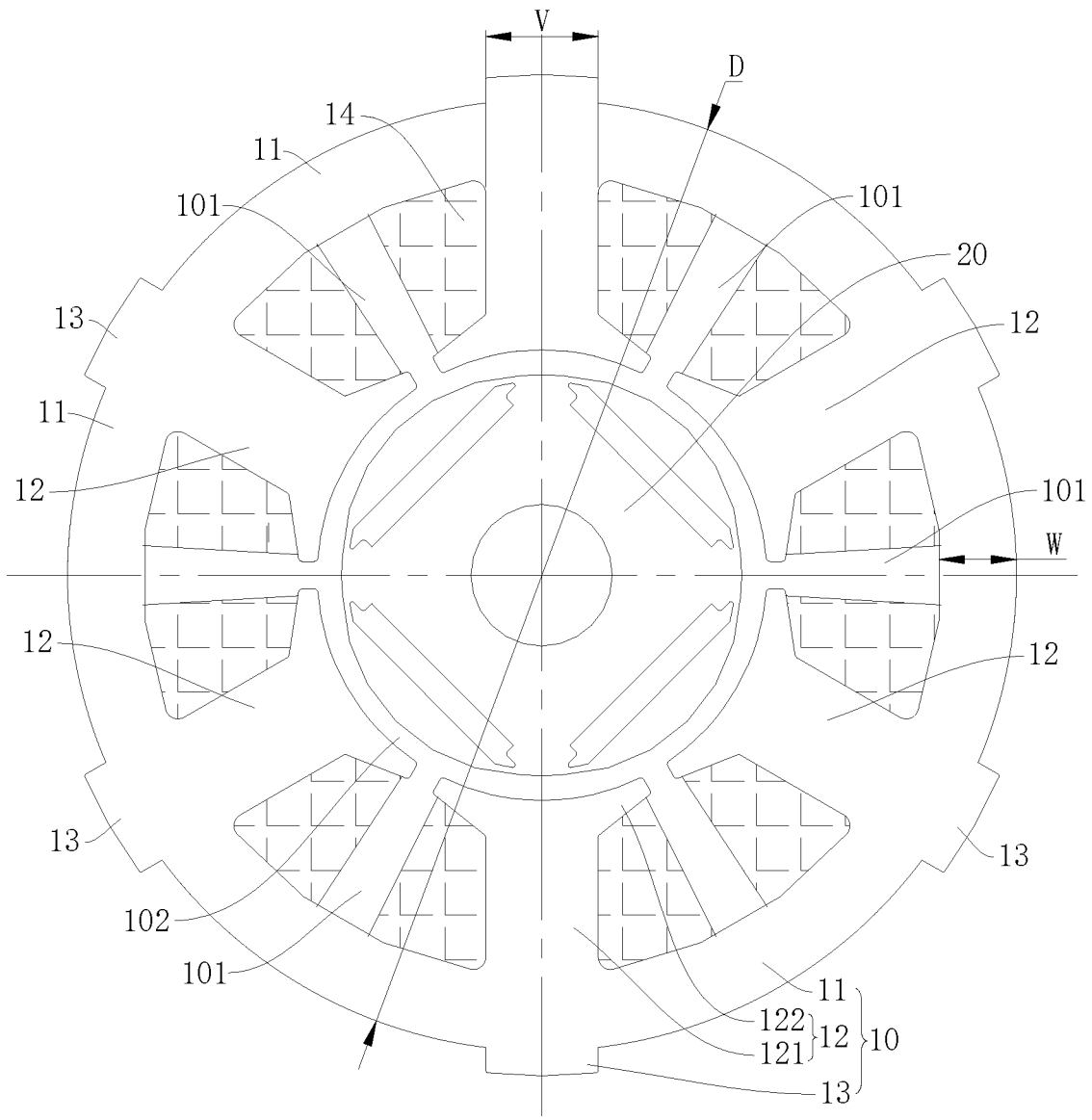
FIG. 1 is a schematic assembly diagram of a stator core and a rotor core of an electric motor according to an embodiment of the present invention.

REFERENCE NUMERALS food processor 200; processing container 210; base 220; electric control system 230;
   display assembly 240;
   electric motor 100;
   stator core 10; stator slot 101; stator hole 102; stator yoke 11; stator teeth 12; stator tooth body 121; stator tooth shoe 122; positioning protrusion 13; winding 14;
   rotor core 20; pole teeth 21; tooth slot 22; magnet slot 23; positioning groove 24; permanent magnet 25.

DETAILED DESCRIPTION OF THE INVENTION

Reference will be made in detail to embodiments of the present application, and the examples of the embodiments are illustrated in the drawings. The embodiments described herein with reference to drawings are illustrative, and merely used to explain the present application. The embodiments shall not be construed to limit the present application. Various changes, modifications, alternatives and variants made by those skilled in the art without departing from the principle and idea of the present disclosure are acceptable. The scope of the present application is defined by the claims and its equivalents.

In the description of the present application, it is to be understood that terms such as "center", "length", "width", "thickness", "upper", "lower", "front", "rear", "left", "right", "inner", "outer", "clockwise", "anticlockwise", "axial", "radial", and "circumferential" should be construed to refer to the orientation as then described or as shown in the drawings under discussion. These relative terms are for convenience of description and do not require that the present application be constructed or operated in a particular orientation, thus cannot be construed to limit the present application. Furthermore, in the description of the present invention, "a plurality of" means two or more unless otherwise stated.

Hereinafter, an electric motor 100 for a food processor 200 according to an embodiment of the present invention will be described with reference to the drawings.

Referring to FIGS. 1-4, an electric motor 100 for a food processor 200 according to an embodiment of the present invention may include a stator core 10 and a rotor core 20.

Specifically, the stator core 10 may include a stator yoke 11 and a plurality of stator teeth 12, The stator yoke 11 is ring-shaped, and the plurality of stator teeth 12 may be provided at an inner peripheral face of the ring-shaped stator yoke 11. The stator yoke 11 may provide a mechanical support for the plurality of stator teeth 12 to fix the stator teeth 12. In addition, the outer contour of the radial section of the stator yoke 11 may be substantially circular, the structure of the stator yoke 11 is more stable, and at the same time, the connection between the stator yoke 11 and the stator teeth 12 are facilitated. The plurality of stator teeth 12 may be spaced apart in the circumferential direction of the stator yoke 11, two adjacent stator teeth 12 may define a stator slot 101 there between, and a winding of the electric motor 100 may be wound around the stator teeth 12 through the stator slot 101.

In addition, the plurality of stator teeth 12 may define a stator hole 102 coaxial with the stator yoke 11, a rotor core 20 may be provided in the stator hole 102, and the rotor core 20 may be coaxial with the stator hole 102. The rotor core 20 may rotate around an axis in the stator hole 102, and a predetermined distance may be formed between the rotor core 20 and an inner peripheral face of the stator hole 102 to make the rotor core 20 rotate more smoothly.

Thus, after a current flows through a winding 14 of the electric motor 100, the plurality of stator teeth 12 form a plurality of pairs of magnetic poles, and a magnetic field is generated in the stator hole 102. The rotor core 20 located in the stator hole 102 may rotate around the axis under the action of the magnetic field to implement conversion and output of an electric energy.

It should be noted that in the present invention, the number of stator teeth 12 may be flexibly set according to actual needs. The six stator teeth 12 in FIG. 1 are merely for illustration. In some other embodiments of the present invention, two, four, or more stator teeth 12 may be provided, which are all within the protection scope of the present invention.

In the related art, a ratio of a rotor diameter to a stator diameter of an electric motor is not constant, usually between 0.60 and 0.75. Within this range, although it may output a large torque, the electric motor has a poor high-speed performance and an increased cogging torque, and is prone to generate vibration and relatively large noises. An energy efficiency of the electric motor will be reduced if the above-mentioned problem is solved by adding a flux weakening effect in an algorithm of a drive and control circuit.

In the present invention, for a maximum radial dimension D of the stator yoke 11 and a maximum radial dimension d of the rotor core 20, the following equation is satisfied: $0.4 \leq d/D \leq 0.55$. For example, in some embodiments of the present invention, the ratio d/D of the maximum radial dimension D of the stator yoke 11 to the maximum radial dimension d of the rotor core 20 may be 0.45, 0.48, 0.51, 0.54, or the like, respectively.

For the stator core 10 with the same shape, i.e., in the case of the constant maximum radial dimension D of the stator yoke 11, when d/D<0.4, the maximum radial dimension d of the rotor core 20 is too small. If the electric motor 100 is operating at a low speed, for example, if a speed of the electric motor 100 is less than 5000 rpm, a load capacity of the rotor core 20 is too small, and under the condition of driving the same load, the rotor core 20 with a maximum radial dimension d that is too small will be overheated, which affects the normal operation of the electric motor 100, reduces the efficiency of the electric motor 100 and may even cause damage.

In the case of the constant maximum radial dimension D of the stator yoke 11, when d/D>0.55, a cogging torque of the electric motor 100 and a moment of inertia of the rotor core 20 will be increased. If the electric motor 100 is operating at a high speed, for example, when the speed of the electric motor 100 is greater than 10000 rpm, the electric motor 100 will generate vibration, and then generate a large noise, which will affect the performance of the electric motor 100 and user experience.

Therefore, with respect to the maximum radial dimension D of the stator yoke 11 and the maximum radial dimension d of the rotor core 20, the following equation is satisfied: $0.4 \leq d/D \leq 0.55$, which may increase an output force of the rotor core 20 of the electric motor 100, enable the electric motor 100 to be more efficient, and prevent the rotor core 20 from heating to be safer. The maximum radial dimension d of the rotor core 20 may be made small to eliminate an inertia generated by the rotor core 20 during the high-speed rotation and prevent the electric motor 100 from generating large vibration noises.

In addition, it should be noted that in some embodiments of the present invention, the outer contours of the stator core 10 and the rotor core 20 are both circular, and the maximum radial dimension refers to the diameter of the circular outer contour of each of the stator core 10 and the rotor core 20. In some other embodiments of the present invention, the outer contours of the stator core 10 and the rotor core 20 are not circular, and the maximum radial dimension may be understood as a dimension of a position at which the radial dimension passing through the axis of the outer contour of each of the stator core 10 and the rotor core 20 is the largest.

In the electric motor 100 for the food processor 200 according to the embodiment of the present invention, with respect to the maximum radial dimension D of the stator yoke 11 and the maximum radial dimension d of the rotor core 20, the following equation is satisfied: $0.4 \leq d/D \leq 0.55$, which solves the problems of the electric motor 100 of a small output force at a low speed and vibration noises at a high speed effectively, and improves an efficiency and a safety performance of the electric motor 100.

In order to further increase the output force at a low speed of the electric motor 100 and reduce vibration noises at a high speed of the electric motor 100, according to a further embodiment of the present invention, with respect to the maximum radial dimension D of the stator yoke 11 and the maximum radial dimension d of the rotor core 20, the following equation may be further satisfied: $0.5 \leq d/D \leq 0.55$.

Figure 2:
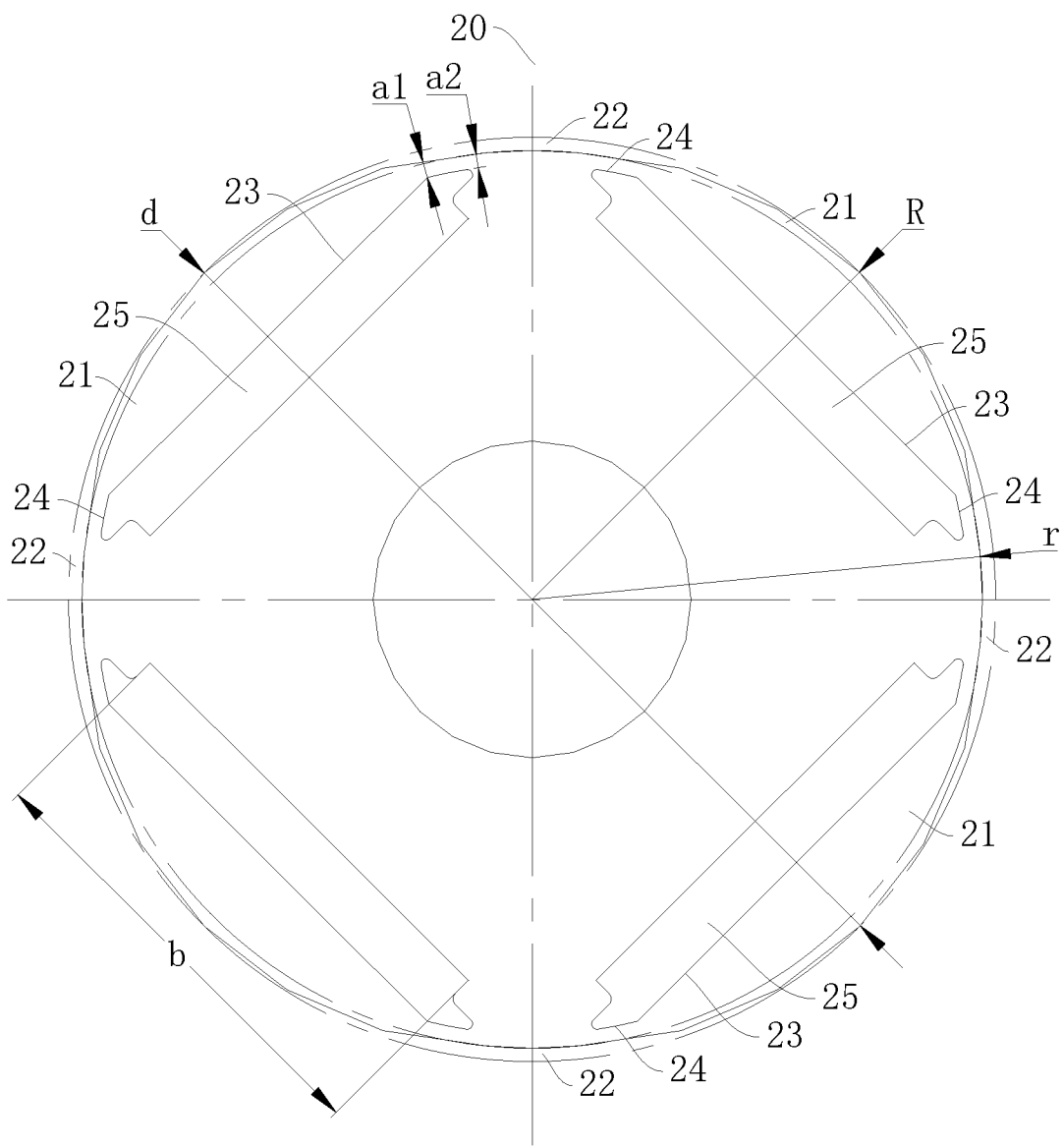
FIG. 2 is a schematic structural diagram of the rotor core of the electric motor according to an embodiment of the present invention.
Figure 3:
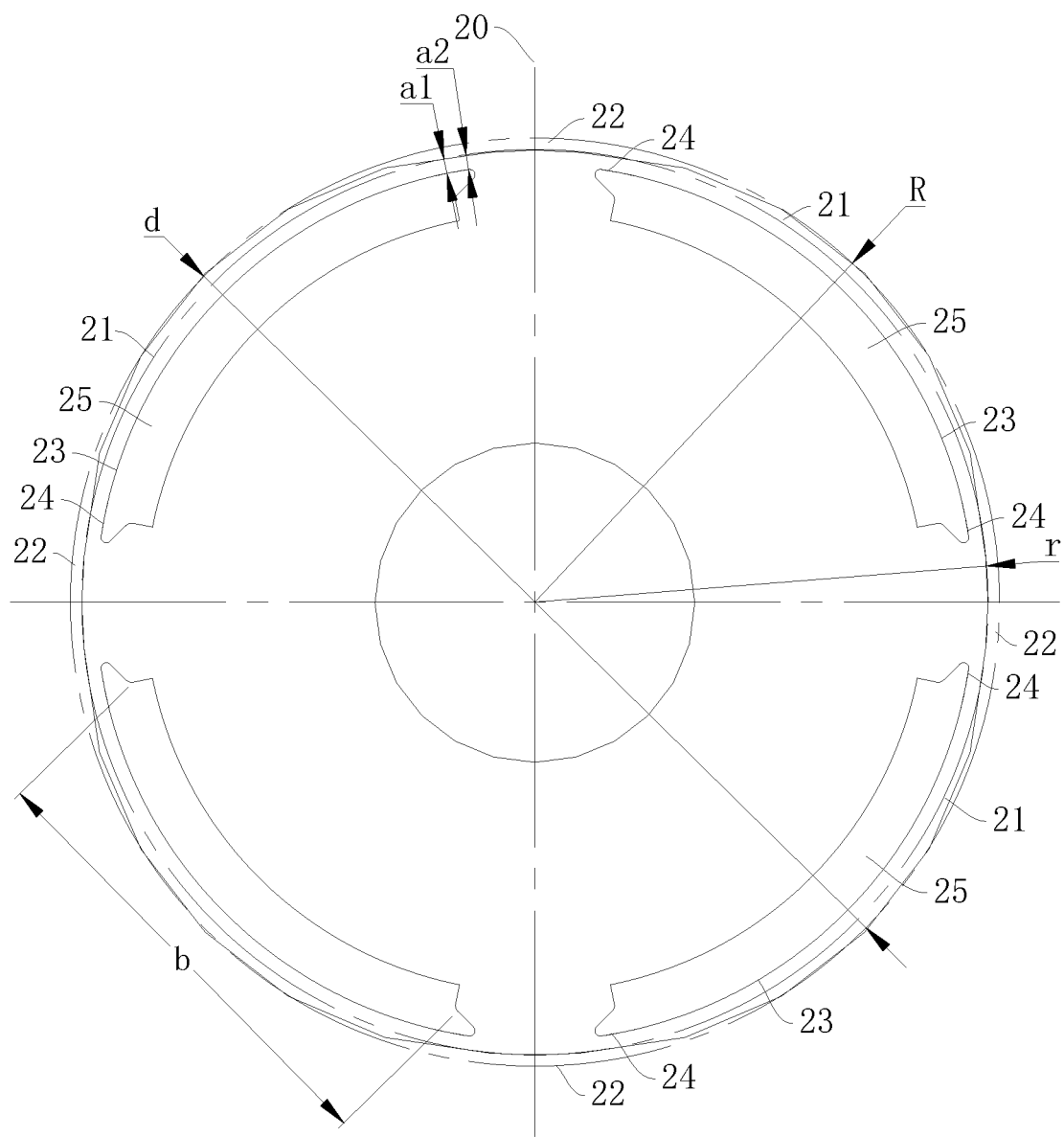
FIG. 3 is a schematic structural diagram of a rotor core of an electric motor according to another embodiment of the present invention.

According to some embodiments of the present invention, as shown in FIGS. 1-3, a plurality of magnet slots 23 may be provided in the rotor core 20, and the plurality of magnet slots 23 may be spaced apart in the circumferential direction of the rotor core 20, two ends of the magnet slot 23 extend to two axial ends of the rotor core 20 respectively, and a plurality of permanent magnets 25 may be inserted in the plurality of magnet slots 23 in one-to-one correspondence.

Thus, the permanent magnet 25 may extend to the two axial ends of the rotor core 20 in the magnet slot 23, and is firmly fixed, which may effectively prevent the permanent magnet 25 from coming loose. In addition, the plural permanent magnets 25 may form a plurality of pairs of magnetic poles to generate a magnetic field, and then generate an induced electromotive force to implement the conversion of the electric energy. The rotor core 20 using the permanent magnet 25 dispenses with a magnet exciting coil, which not only facilitates reduction of the weight and volume of the electric motor 100, but also realizes rapid startup and saves more energy without excitation startup.

It should be noted that in the present invention, the number of magnet slots 23 and permanent magnets 25 are not limited specifically, so long as the plural permanent magnets 25 are inserted into the plurality of magnet slots 23 in one-to-one correspondence to fix the permanent magnets 25 and to form a plurality of magnetic poles. For example, in the embodiments shown in FIGS. 2 and 3, four magnet slots 23 and four permanent magnets 25 are provided, and the four permanent magnets 25 are inserted into the four magnet slots 23 respectively. For another example, in some other embodiments of the present invention, two, six, eight or more magnet slots 23 and two, six, eight or more permanent magnets 25 may be provided, which are all within the protection scope of the present invention.

In addition, each magnet slot 23 may be provided with a positioning groove 24 at least one end in the circumferential direction of the rotor core 20. The permanent magnet 25 may be inserted into the positioning groove 24 while into the magnet slot 23. The positioning groove 24 may further define the position of the permanent magnet 25, the permanent magnet 25 is positioned more accurately and firmly.

Further, as shown in FIGS. 2 and 3, a straight-line distance between two ends of each of the magnet slots 23 in the circumferential direction of the rotor core 20 is b, and a maximum radial distance between a center of the rotor core 20 and an outer peripheral face of the rotor core 20 is R, in which b:R=0.95-1.0.

If b:R<0.95, the length of the permanent magnet 25 in the magnet slot 23 is too short, which reduces an utilization rate of the rotor core 20, lowering the energy efficiency of the electric motor 100; if b:R>1, flux leakage of the rotor core 20 is increased, which also reduces the energy efficiency of the electric motor 100. Thus, in some embodiments of the present invention, if b:R=0.95-1.0, for example, in some embodiments of the present invention, b:R may 0.95, 0.96, 0.97, 0.98, 0.99, 1.0, or the like, respectively, which effectively guaranteeing the energy efficiency of the electric motor 100.

According to some embodiments of the present invention, as shown in FIGS. 2 and 3, a minimum distance between the magnet slot 23 and the outer peripheral face of the rotor core 20 is a1, a minimum distance between the positioning groove 24 and the outer peripheral face of the rotor core 20 is a2, and a minimum distance between the permanent magnet 25 and the outer peripheral face of the rotor core 20 may be interpreted as the smaller one of a1 and a2, i.e., min (a1, a2). If min (a1, a2) is too small, a mechanical strength of the rotor core 20 will be reduced, reducing the reliability of the rotor core 20; if min (a1, a2) is too large, the flux leakage of the rotor core 20 will be increased, reducing the energy efficiency of the electric motor 100.

Thus, in some embodiments of the present invention, min (a1, a2)=0.8 mm-1.8 mm, guaranteeing the mechanical strength and the energy efficiency of the rotor core 20. For example, in some embodiments of the present invention, min (a1, a2) may be 0.8 mm, 1.0 mm, 1.2 mm, 1.4 mm, 1.6 mm, 1.8 mm, or the like, respectively.

In addition, the shape of the magnet slot 23 is not limited in the present invention, so long as a bisector of the magnet slot 23 in a length direction passes through a center of the rotor core 20, the magnetic field generated by the permanent magnet 25 in the magnet slot 23 is distributed more uniformly. For example, in the example shown in FIG. 2, the magnet slot 23 is an elongated linear slot which extends in a chord direction of the rotor core 20, and a distance b between two ends of the linear slot is an extension length of the linear slot. In the example shown in FIG. 3, the magnet slot 23 is an elongated arc-shaped slot extending in the circumferential direction of the rotor core 20, and a distance b between two ends of the arc-shaped slot is a chord length of the arc-shaped slot.

In some embodiments of the present invention, as shown in FIG. 1, the stator core 10 may further include a plurality of positioning protrusions 13, spaced apart in the circumferential direction of the rotor yoke 11 and provided at the outer peripheral face of the stator yoke 11, and extending in the radial direction of the stator yoke 11. Thus, when the electric motor 100 is assembled, the stator core 10 may be positioned with the positioning protrusions 13 and a bracket of the electric motor 100, the assembly of the electric motor 100 is more simple and convenient, and positioned accurately.

It should be noted that the number and position of positioning protrusions 13 are not limited in the present invention. For example, in the embodiment shown in FIG. 1, the number of positioning protrusions 13 is equal to the number of stator teeth 12, and the positioning protrusions 13 and the stator teeth 12 are provided at the outer peripheral face of the stator yoke 11 in one-to-one correspondence, which facilitates mold design and molding of the stator core 10. In some embodiments of the present invention not shown herein, the number and position of positioning protrusions 13 may not be in one-to-one correspondence to the number and position of stator teeth 12, so long as the positioning protrusions 13 are provided at intervals at the outer peripheral face of the stator yoke 11 to position the stator core 10.

According to some embodiments of the present invention, as shown in FIG. 1, each of the stator slots 101 may be communicated with the stator hole 102 respectively, the winding 14 of the stator core 10 is wound via an opening of the stator slot 101 communicated with the stator hole 102 easily and rapidly.

In some embodiments of the present invention, as shown in FIGS. 2 and 3, a plurality of pole teeth 21 may be formed on an outer periphery of the rotor core 20, and distributed in the circumferential direction of the rotor core 20 and protrude outwards, and two adjacent pole teeth 21 define a tooth slot 22 there between. In the embodiment where a plurality of magnet slots 23 is provided, the magnet slots 23 may be provided in one-to-one correspondence to the pole teeth 21. At this point, the rotor core 20 is formed as a rotor with a salient pole structure. Compared with a circular rotor in the related art, the rotor with a salient pole structure may prevent the flux leakage between the rotor poles and a cogging effect, improving an efficiency of the rotor core 20.

In addition, it should be noted that for the rotor core 20 having a plurality of pole teeth 21, the maximum outer diameter dimension d of the rotor core 20 refers to the dimension of a connection line of tooth crests of the two pole teeth 21 passing through the axis of the rotor core 20.

Further, referring to FIGS. 2 and 3, a normal tooth profile of the pole teeth 21 is formed into an arc shape, the outer periphery of an axial section of the rotor core 20 may be formed by connecting a plurality of arcs successively, and the tooth slot 22 is formed at a joint of two adjacent arcs.

In addition, as shown in FIGS. 2 and 3, a radius of a circle with a center of the rotor core 20 as a center and tangent to a tooth crest of the pole tooth 21 is R (at this point, R=0.5d), and a radius of a circle tangent to a bottom of the tooth slot 22 and with the center of the rotor core 20 as a center is r. If r:R<0.96, the extension length of the pole teeth 21 in the circumferential direction of the rotor core 20 will be too short, which reduces the performance of the electric motor 100; if r:R>0.98, the tooth slot 22 is too small, which may not reduce noise disturbance generated by the tooth slot effectively when the electric motor 100 is in operation. Therefore, in some embodiments of the present invention, r:R=0.96-0.98. For example, in some embodiments of the present invention, r:R may be 0.96, 0.97, 0.98, or the like, respectively, which effectively reduces the cogging effect and guarantees the efficiency of the electric motor 100.

In addition, in the related art, a ratio of a magnet yoke width to a tooth width of the electric motor stator is not constant, usually 0.4-0.6, the stator yoke bears a larger proportion of iron loss to reduce heat revolution and temperature rise of the stator teeth, but to cause the problem of excessive temperature rise of the stator yoke. If the above-mentioned problem is solved by fitting a magnetic conductive casing over the electric motor, a magnetic flux density of the stator yoke may be reduce to some extent, and the iron loss of the stator yoke may be lowered, but materials and process costs will be increased.

In the present invention, referring to FIG. 1, each of the stator teeth 12 may include a stator tooth body 121 and a stator tooth shoe 122. The stator tooth body 121 is connected with the stator yoke 11, the stator teeth 12 and the stator yoke 11 may be integrally connected; the stator tooth shoe 122 is provided at an inner end of the stator tooth body 121, which may on the one hand, reduce an air gap reluctance between the stator teeth 12 and the rotor core 20 and improve the magnetic field distribution, and on the other hand, fix the winding 14 on the stator teeth 12 more reliably to prevent the winding 14 from being loosened from the inner end of the stator teeth 12.

In addition, the width of the stator yoke 11 is equal everywhere to mold the stator core 10 conveniently. The width of the stator yoke 11 may be W, and the width of each of the stator tooth bodies 121 may be V. For the stator core 10 with the same shape, i.e., in the case of the constant maximum radial dimension D of the stator core 10, if W:V is too small, the magnetic flux density of the stator teeth 12 will be too high, and even the magnetic flux density is saturated, the iron loss of the stator teeth 12 is relatively large, causing the excessive temperature rise of the stator teeth 12 when the electric motor 100 is operating. In addition, the stator slot 101 between two adjacent stator teeth 12 is too small, and the distance between two adjacent stator teeth 12 is too short, which easily forms an electromagnetic circuit, reducing the energy efficiency of the electric motor 100.

If W:V is too large, the magnetic flux density of the stator yoke 11 will be too high, and even the magnetic flux density is saturated. When the electric motor 100 is in operation, the iron loss of the stator yoke 11 is relatively large, causing the excessive temperature rise.

Therefore, in some embodiments of the present invention, with respect to the width W of the stator yoke 11 and the width V of each of the stator tooth bodies 121, the following equation may be satisfied: W:V=0.6-0.7, and the stator yoke 11 and the stator teeth 12 may distribute the magnetic flux density of the stator core 10 more reasonably, the temperature rise of the electric motor 100 is more balanced, to prolong the service life of the electric motor 100 and improve the safety performance of the electric motor 100. For example, in some embodiments of the present invention, the ratio W:V of the width W of the stator yoke 11 to the width V of the stator tooth body 121 may be 0.6, 0.63, 0.65, 0.68, 0.7, or the like, respectively.

It should be noted that in the present invention, the width W of the stator yoke 11 may be understood as the distance between the inner peripheral face and the outer peripheral face of the annular stator yoke 11, and the width V of the stator tooth body 121 may be understood as the distance between the two side surfaces of the stator tooth body 121 in the circumferential direction of the stator yoke 11.

In addition, the distance between the inner peripheral face and the outer peripheral face of the annular stator yoke 11 may be equal everywhere. Certainly, the distance between the inner peripheral face and the outer peripheral face of the annular stator yoke 11 may not be exactly the same. The distance between the inner peripheral face and the outer peripheral face of the annular stator yoke 11 may be the same everywhere or may not be exactly the same.

However, in the present invention, with respect to the width W of the stator yoke 11 at any position and the width V of the stator tooth body 121 at any position, the following equation is satisfied: W:V=0.6-0.7.

For the width W of the stator yoke 11 and the width V of the stator tooth body 121 of the stator core 10 of the electric motor 100 according to the embodiment of the present invention, the following equation is satisfied: W:V=0.6-0.7, with more reasonable distribution of the magnetic flux density, and more balanced temperature rise, which is beneficial to prolonging the service life and improving the safety.

In order to further reduce the temperature rise of the stator core 10, according to a further embodiment of the present invention, for the width W of the stator yoke 11 and the width V of the stator tooth body 121, the following equation is further satisfied: W:V=0.64-0.66.

According to some embodiments of the present invention, as shown in FIG. 1, the width of each of the stator tooth bodies 121 may be equal everywhere, to facilitate the mold design of the stator core 10 during the molding process, with the simpler process.

Further, referring to FIG. 1, the stator yoke 11 may be configured as a circular ring having both the circular inner contour and the circular outer contour. The structure of the stator yoke 11 is simple and easy to mold.

In addition, a width bisector of each of the stator tooth bodies 121 may pass through a center of the stator hole 102. That is, each of the stator tooth bodies 121 extends in the radial direction of the stator hole 102, which contributes to more symmetrical and uniform distribution of the magnetic field.

Further, referring to FIG. 1, in the circumferential direction of the stator yoke 11, two ends of the stator tooth shoe 122 extend beyond the stator tooth body 121 respectively, and adjacent ends of two adjacent stator tooth shoes 122 are spaced apart or connected. Thus, the winding 14 wound on the stator teeth 12 may be fixed more reliably to prevent the winding 14 from being loosened from the inner end of the stator teeth 12.

According to some embodiments of the present invention, the electric motor 100 may be a brushless direct-current electric motor with a power P of 500 W-2000 W. The brushless direct-current electric motor dispenses with a carbon brush for commutation, without the phenomenon of carbon brush wear, with lower noise of the electric motor 100 and longer service life of the electric motor 100.

The electric motor 100 for a food processor 200 according to the embodiment of the present invention may be a variable frequency brushless electric motor. Depending on the type of food to be processed by the food processor 200, the variable frequency brushless electric motor may provide different speeds, torques, and periods of time, or the like, the food processor 200 having the electric motor 100 is a smart device. In addition, the variable frequency brushless electric motor dispenses with a structure, such as a carbon brush, for commutation, without the phenomenon of carbon brush wear, with lower running noises, which is beneficial to prolonging the service life of the food processor 200 and improving the user experience.

Figure 4:
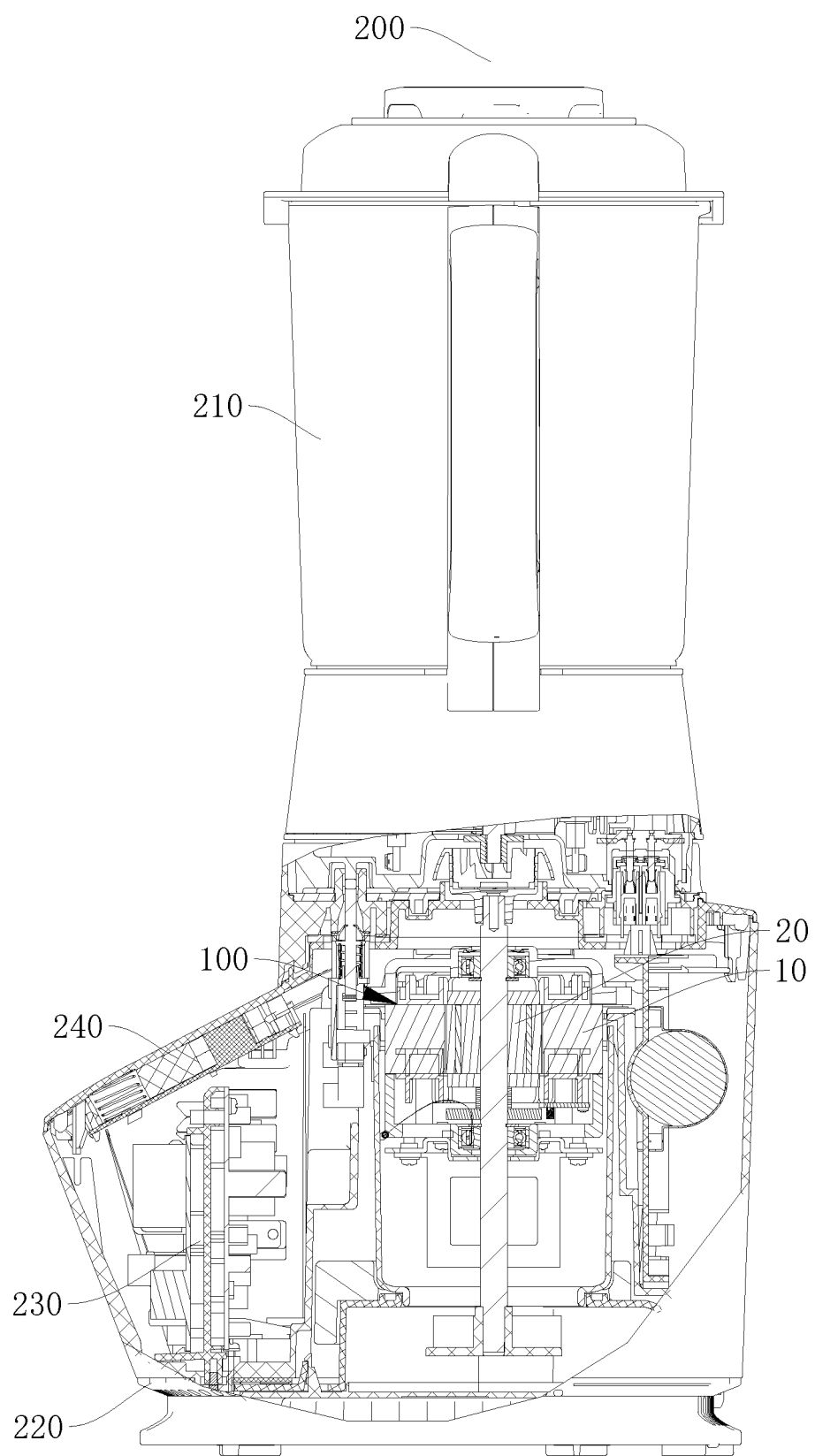
FIG. 4 is a schematic structural diagram of a food processor according to an embodiment of the present invention.

As shown in FIG. 4, the food processor 200 according to the embodiment of the present invention may include a processing container 210, a food processing member, and an electric motor 100 for the food processor 200 according to the embodiment of the present invention.

Specifically, the processing container 210 may have a food accommodating cavity configured to contain food therein, and the food processing member may be in transmission connection with the electric motor 100 and extend into the food accommodating cavity. Thus, the food processing member may be driven by the electric motor 100 to rotate relative to the processing container 210, processing the food in the food accommodating cavity.

Since the electric motor 100 for the food processor 200 according to the embodiment of the present invention has the above-mentioned advantageous technical effects, the food processor 200 according to the embodiment of the present invention effectively solves the problems of the electric motor of 100 a small output force at a low speed and vibration noises at a high speed effectively, and improves the efficiency and safety performance of the electric motor 100.

Further, the food processor 200 may further include a base 220, and the processing container 210 may be configured as a cup assembly detachably provided at the base 220, for conveniently placing and fetching food and cleaning the cup assembly. The electric motor 100 may be mounted at the base 220, the food processing member may be configured as a knife assembly connected with the cup assembly, and when the cup assembly is provided at the base 220, the electric motor 100 may be in transmission connection with the knife assembly to drive the knife assembly to rotate relative to the cup assembly, the knife assembly may process the food, e.g., cut the food.

Referring to FIG. 4, the food processor 200 may further include: an electric control system 230 and a display assembly 240, in which the electric control system 230 includes an electric control board which may be mounted at the base 220 and electrically connected with the electric motor 100 to control the electric motor 100 to work.

The display assembly 240 may also be mounted at the base 220 and electrically connected to the electric control system 230, to display an operating state of the food processor 200. In a further embodiment of the present invention, the display assembly 240 may have operation keys. The user may control the electric control system 230 with the operation keys, controlling a working mode, state, or the like, of the food processor 200, being more convenient to use.

In one embodiment, in the present invention, the food processor 200 may be configured as a blender, a high speed blender, a slow juicer, a juice extractor, or a soymilk maker. The blender has a relatively high rotational speed, and may mix the food more evenly by high-speed agitation; the high speed blender has a high rotational speed, is configured to process harder food, and may release a large amount of phytochemical of food existing in peel, kernels and rootstock by breaking walls thereof sufficiently; the slow juice rotates at a low speed and processes food by means of push-type extrusion and low-flexibility extraction; the juice extractor rotates at a high speed to smash and mix more kinds of food; the soymilk maker rotates at a relatively high speed, and may implement the processes of preheating, mashing, cooking and delayed cooking, being fully automatic. The electric motor 100 according to the embodiment of the present invention may be applied to more types of food processors 200 to fit more needs, and has greater practicability.

Other configurations and operations of the food processor 200 and the electric motor 100 according to the embodiment of the present invention are known to those skilled in the art, and will not be described in detail herein.

In the description of the present invention, it should be noted that unless specified or limited otherwise, the terms "mounted", "connected", and "coupled" and the like are used broadly, and may be, for example, fixed connections, detachable connections, or integral connections; may also be mechanical or electrical connections; may also be direct connections or indirect connections via intervening structures; may also be inner communications of two elements. The above terms can be understood by those skilled in the art according to specific situations.

In the description of the present specification, reference throughout this specification to "an embodiment", "specific embodiments", "example" means that a particular feature, structure, material, or characteristic described in connection with the embodiment or example is included in at least one embodiment or example of the present invention. In the specification, the schematic expressions to the above-mentioned terms are not necessarily referring to the same embodiment or example. Furthermore, the described particular features, structures, materials, or characteristics may be combined in any suitable manner in one or more embodiments or examples without interferences and contradictions.

What is claimed is:

1. An electric motor for a food processor, comprising:
a stator core having a ring-shaped stator yoke and a plurality of stator teeth provided at an inner peripheral face of the ring-shaped stator yoke, two adjacent stator teeth defining a stator slot there between, the plurality of the stator teeth defining a stator hole coaxial with the ring-shaped stator yoke, and an outer contour of a radial section of the ring-shaped stator yoke being substantially circular and having a maximum radial dimension D; and
a rotor core rotatably provided in the stator hole and coaxial with the stator hole, the rotor core having a maximum radial dimension d, wherein D and d satisfy: $0.4 \leq d/D \leq 0.55$;
wherein the rotor core is provided therein with a plurality of magnet slots spaced apart in a circumferential direction of the rotor core and configured to insert permanent magnets, two ends of each of the plurality of magnet slots extend to two axial ends of the rotor core respectively, and at least one end of each of the magnet slots in the circumferential direction of the rotor core is provided with a positioning groove configured to position the permanent magnet;
wherein the permanent magnet is inserted into the positioning groove and each of the plurality of magnet slots.

2. The electric motor according to claim 1, wherein D and d further satisfy: $0.5 \leq d/D \leq 0.55$.

3. The electric motor according to claim 1, wherein a straight-line distance between two ends of each of the magnet slots in the circumferential direction of the rotor core is b, and a maximum radial distance between a center of the rotor core and an outer peripheral face of the rotor core is R, wherein $b:R=0.95-1.0$.

4. The electric motor according to claim 3, wherein a minimum distance between the magnet slot and the outer peripheral face of the rotor core is a1, and a minimum distance between the positioning groove and the outer peripheral face of the rotor core is a2, wherein min (a1, a2)=0.8 mm-1.8 mm.

5. The electric motor according to claim 1, wherein the magnet slot is an elongated arc-shaped slot or a linear slot, and a bisector of the magnet slot in a length direction passes through a center of the rotor core.

6. The electric motor according to claim 1, wherein the stator core further comprises:
a plurality of positioning protrusions spaced apart in a circumferential direction of a rotor yoke and provided at an outer peripheral face of the ring-shaped stator yoke, and each of the positioning protrusions extending in a radial direction of the ring-shaped stator yoke.

7. The electric motor according to claim 1, wherein the rotor core has an outer periphery provided with a plurality of pole teeth distributed in a circumferential direction of the rotor core and protruding outwards, and two adjacent pole teeth define a tooth slot there between.

8. The electric motor according to claim 7, wherein a normal tooth profile of a pole tooth is formed into an arc shape, and a radius of a circle with a center of the rotor core as a center and tangent to a tooth crest of the pole tooth is R, and a radius of a circle tangent to a bottom of the tooth slot and with the center of the rotor core as a center is r, wherein $r:R=0.96-0.98$.

9. The electric motor according to claim 1, wherein a width of the ring-shaped stator yoke is W and is equal everywhere, each of the stator teeth comprises a stator tooth body connected to the ring-shaped stator yoke and a stator tooth shoe provided at an inner end of the stator tooth body, and a width of each stator tooth body is V, wherein $W:V=0.6-0.7$.

10. The electric motor according to claim 9, wherein W and V further satisfy: $W:V=0.64-0.66$.

11. The electric motor according to claim 9, wherein the width of each stator tooth body is uniformly equal.

12. The electric motor according to claim 11, wherein the ring-shaped stator yoke is a circular ring having both a circular inner contour and a circular outer contour.

13. The electric motor according to claim 11, wherein in a circumferential direction of the ring-shaped stator yoke, two ends of the stator tooth shoe extend beyond the stator tooth body respectively, and adjacent ends of two adjacent stator tooth shoes are spaced apart or connected.

14. The electric motor according to claim 1, wherein the electric motor is a brushless direct-current electric motor with a power P of 500 W-2000 W.

15. The electric motor according to claim 1, wherein the electric motor is a variable frequency brushless electric motor.

16. A food processor, comprising:
 a processing container defining a food accommodating cavity configured to contain food;
 an electric motor according to claim 1; and
 a food processing member configured to process food, extending into the food accommodating cavity, and configured to rotate relative to the processing container under driving of the electric motor.

17. The food processor according to claim 16, further comprising:
 a base, wherein the processing container is configured as a cup assembly detachably provided at the base, the electric motor is mounted at the base, the food processing member is configured as a knife assembly connected with the cup assembly, and when the cup assembly is provided at the base, the electric motor is in transmission connection with the knife assembly to drive the knife assembly to rotate relative to the cup assembly.

18. The food processor according to claim 17, further comprising:
 an electric control system having an electric control board mounted at the base and electrically connected with the electric motor to control the electric motor to work; and
 a display assembly configured to display an operating state of the food processor, mounted at the base and electrically connected to the electric control system.

19. The food processor according to claim 16, wherein the food processor is configured as a blender, a high speed blender, a slow juicer, a juice extractor, or a soymilk maker.

\* \* \* \* \*